United States Patent
Cerea et al.

(10) Patent No.: US 11,861,443 B2
(45) Date of Patent: Jan. 2, 2024

(54) METHOD FOR MANUFACTURING A TAG FOR A TEXTILE

(71) Applicant: DATAMARS SA, Lamone (CH)

(72) Inventors: Luca Cerea, Varese (IT); Julien Buros, Cassina d'Agno (CH)

(73) Assignee: DATAMARS SA, Lamone (CH)

( * ) Notice: Subject to any disclaimer, the term of this patent is extended or adjusted under 35 U.S.C. 154(b) by 0 days.

(21) Appl. No.: 17/801,596

(22) PCT Filed: Jun. 2, 2021

(86) PCT No.: PCT/IB2021/054829
§ 371 (c)(1),
(2) Date: Aug. 23, 2022

(87) PCT Pub. No.: WO2021/245567
PCT Pub. Date: Dec. 9, 2021

(65) Prior Publication Data
US 2023/0351141 A1    Nov. 2, 2023

(30) Foreign Application Priority Data

Jun. 4, 2020 (IT) .......................... 102020000013294

(51) Int. Cl.
*G06K 19/07* (2006.01)
*G06K 19/077* (2006.01)

(52) U.S. Cl.
CPC . *G06K 19/07773* (2013.01); *G06K 19/07722* (2013.01)

(58) Field of Classification Search
CPC .................. G06K 19/07773; G06K 19/07722
See application file for complete search history.

(56) References Cited

U.S. PATENT DOCUMENTS

| 10,130,524 | B1 * | 11/2018 | Lai ................... G08B 13/19669 |
| 2005/0183990 | A1 * | 8/2005 | Corbett, Jr. ........... D06F 93/005 209/3.3 |

(Continued)

FOREIGN PATENT DOCUMENTS

| CA | 2672027 A1 * | 1/2010 | ........... G06Q 10/087 |
| CN | 201654823 U * | 11/2010 | |

(Continued)

OTHER PUBLICATIONS

CN 207249709 U—A UHF RFID Label for Washing Management, 5 pages. (Year: 2023).*

(Continued)

*Primary Examiner* — Tuyen K Vo
(74) *Attorney, Agent, or Firm* — THE WEBB LAW FIRM

(57) ABSTRACT

A method for manufacturing a tag for fabric is described. The tag includes a radio module with an ultra high transmission frequency, a radio-frequency identification integrated circuit connected to the UHF module, an antenna, and a substrate, and includes mounting the UHF radio module and the RFID integrated circuit on the substrate, these being already electrically connected by means of metal tracks, and mounting the antenna on the substrate. The method includes applying a protective coating on the UHF radio module and on the RFID integrated circuit, which includes coating the metal tracks for electrical connection between the RFID integrated circuit and the UHF radio module and, furthermore, coating a surface portion of the substrate situated around the UHF radio module and the RFID integrated circuit.

10 Claims, 1 Drawing Sheet

(56) References Cited

U.S. PATENT DOCUMENTS

| | | |
|---|---|---|
| 2014/0291409 A1 | 10/2014 | Nitta |
| 2018/0293480 A1* | 10/2018 | Osamura ............ G06K 19/0775 |
| 2019/0228280 A1 | 7/2019 | Zanesi |
| 2020/0076048 A1* | 3/2020 | Moraru .................... H01Q 1/40 |

FOREIGN PATENT DOCUMENTS

| | | | |
|---|---|---|---|
| CN | 207249709 U * | 4/2018 | ......... G06K 19/0723 |
| EP | 2772873 A1 | 9/2014 | |
| JP | 2013206080 A | 10/2013 | |
| WO | WO-2011005550 A3 * | 4/2011 | ............... D06H 1/00 |
| WO | WO-2013068043 A1 * | 5/2013 | ....... G06K 19/07758 |

OTHER PUBLICATIONS

CN 201654823 U—Electronic Label for RFID Flexible Clothes-washing Mark, 3 pages. (Year: 2023).*

* cited by examiner

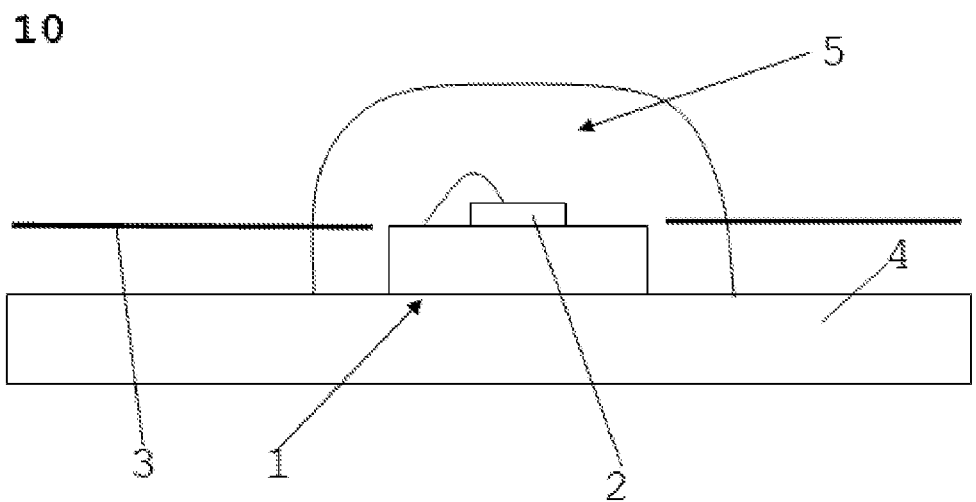

METHOD FOR MANUFACTURING A TAG FOR A TEXTILE

CROSS-REFERENCE TO RELATED APPLICATIONS

This application is the United States national phase of International Application No. PCT/I62021/054829 filed Jun. 2, 2021, and claims priority to Italian Patent Application No. 102020000013294 filed Jun. 4, 2020, the disclosures of which are hereby incorporated by reference in their entirety.

BACKGROUND OF THE INVENTION

Field of the Invention

The present invention relates to a method for manufacturing a tag for a fabric, in particular, but not exclusively a tag for identification of a garment associated with it, for example for identification of the garment in a laundry.

The present invention also relates to a tag obtained using the aforementioned method, and in particular a tag for fabric, comprising a radio module with a high transmission frequency, a radio-frequency identification integrated circuit connected to the radio module, an antenna, and a substrate for supporting the radio module, the integrated circuit and the antenna.

Description of Related Art

Methods for manufacturing a tag for a fabric are known, the tag being of the type intended to be fixed, for example, to a garment (or other fabrics).

The garment must be able to be identified, for example within a laundry, during a washing or treatment process where it is required to be able to identify the owner of the garment, among other things in order to be able to return the garment to the owner, following treatment.

The known tags are designed so that the garment may be identified by means of a contactless reader.

Therefore, the tags generally comprise a package in which a radio module with a high transmission frequency, in particular ultra high frequency (UHF), is embedded in a radio-frequency identification integrated circuit (RFID IC) by means of a manufacturing method performed by microcircuit manufacturing companies. This method involves the application of a protective material on the radio module and on the integrated circuit, already mounted on the radio module, and therefore the formation of a coating which forms the external part of the package.

The package is then integrated with the other components of the tag, by the tag manufacturer, and therefore by a company different from the microcircuit manufacturer.

In particular, the package is fixed, with an antenna, to a substrate, for example textile substrate, which forms a support for the package and the antenna. It is not necessary to provide direct electrical contacts between the components of the package and the antenna, since the latter is inductively coupled with the package.

Fixing of the package onto the textile substrate is performed using a glue or a resin. The antenna may be stitched to the substrate or lies around the package, forming for example a closed ring which surrounds the package.

Although this method is widely used, it has a number of drawbacks.

Firstly, the application of the glue or the resin onto the package results in the accumulation of material (i.e. glue) on the protective material already forming part of the package, something which results in an increase in the size of the tag as a whole, in particular its thickness.

The increase in the dimensions, which per se is undesirable since it makes the tag more visible on the garment, also increases the risk of accidental separation of the package or parts of the antenna from the substrate, owing to the greater resistance of the tag to the bending stress acting on it once it has been fixed to the garment. This limited flexibility also partially negatively affects the flexibility in the garment in the zone where the tag is fixed.

Furthermore, but not in order of importance, the aforementioned method is relatively costly, since it requires a component, the pre-assembled package, which per se is already costly. This is understandable in the light of the packaging process described above.

The technical problem underlying the present invention is that of devising a method for manufacturing a tag for fabric which is able to overcome all the aforementioned drawbacks, providing therefore a tag which is particularly resistant to stresses, has small dimensions, is extremely flexible and more cost-efficient than those which are currently available on the market, thus overcoming all the drawbacks which are currently associated with the known tags. US2019228280, JP2013206080, EP2772873 are examples of method for manufacturing tags.

SUMMARY OF THE INVENTION

The idea underlying the present invention is that of mounting, on a substrate of a tag, in particular a textile substrate, or tag for a fabric, a radio module and an integrated circuit associated with it, and of protecting the electrical and structural connection between the module and circuit by means of the same material used to fix the module and the integrated circuit to the textile substrate.

In particular, the radio module and the integrated circuit are not incorporated by means of a protective material which forms a package and are, so to speak, "bare", i.e. the electric tracks interconnecting the module and the circuit externally are exposed, before the method for fixing the module and the integrated circuit to the textile substrate is performed.

It is the method itself for fixing the module and the circuit to the substrate which also performs coating of the electric tracks, thus providing with a single material and same procedural step the protection of the electrical contacts (tracks) between the module and the circuit, and the stable positioning of the module and the circuit on the substrate.

In an embodiment, described also in connection with an example below, this procedural step also comprises the partial coating of the tag antenna, in the area of the substrate immediately surrounding the module and the circuit, thus ensuring also the positioning of the antenna relative to the module and the circuit.

According to the proposed solution described above, the technical problem underlying the present invention is solved by a method for manufacturing a tag for fabric as described herein.

Still according to the proposed solution described above, the technical problem is solved also by a tag for fabric as described herein.

According to one aspect of the present invention, the tag is formed directly on a fabric. The term "support substrate", therefore, may be understood as meaning a textile support, i.e. without the use of other materials, for example plastic materials.

Mounting of the antenna on the textile support may be performed separately from mounting of the radio module and the integrated circuit on the fabric.

In particular, the radio module and the integrated circuit are already connected together by means of "flip chip" or "wire bonding" technology before being mounted on the textile support. However, before being mounted on the textile support, the radio module and the integrated circuit are not connected to a long-range antenna. This connection with the antenna is performed directly on the textile support where the antenna may be stitched, forming a ring inside which the radio module and the integrated circuit are then positioned and retained in this position by a glue or a resin, which also provides a local protective coating. The textile support with the antenna, the radio module and the integrated circuit is then intended to be mounted on the fabric to be tracked, for example (but not exclusively) on a garment.

The manufacturing method according to the prior art, instead, involves incorporating all the electronic components necessary for tracking, including the long-range antenna and the microchip, in a so-called "inlay" and associating the inlay with multiple layers, such as an adhesive layer situated underneath the inlay, a silicone layer situated underneath the adhesive layer and a PET layer situated above the inlay, and finally fixing the multilayer structure thus formed to the fabric to be tracked, for example by means of heat welding. The inlay according to the prior art incorporates the chip and the antenna, made of aluminium, copper or silver, and these components may not be applied separately to a textile support (or support made of other material) as is instead envisaged by the present invention.

According to the present invention, by means of innovative method steps, it is not envisaged forming a multilayer structure for the tag. The radio module and the integrated circuit are not incorporated in an inlay and are not structurally associated with a long-range antenna, at least not before coupling with the textile substrate. Instead, they are mounted directly onto the textile substrate; only on the textile substrate are they coated with a local protective coating, in the form of a resin or glue; it is only on the textile substrate that the structural connection between the long-range antenna and the radio module/integrated circuit is performed (using the glue or the resin) and it is only on the textile substrate that the structural connection between radio module/integrated circuit and textile substrate is performed.

In a variation of embodiment of the present invention, the structural connection between the radio module/integrated circuit and the substrate may involve a non-textile substrate. In this case also, however, and as already mentioned above, no inlay or multilayer structure is provided, but instead the radio module and the integrated circuit, which are already structurally connected together, may be mounted on the substrate separately from the antenna.

The protective coating. i.e. the glue or the resin, may not be regarded as being a layer of the tag, since it affects only the radio module, the integrated circuit and the surface immediately surrounding them, namely without coating or being extended over other parts of the substrate.

The order of superimposition of the radio module and the integrated circuit with respect to the textile layer is not limiting for the invention. Preferably, the radio module is in direct contact with the textile substrate, and the integrated circuit is situated above the radio module, without being in direct contact with the textile substrate. It is possible, however, for there to be direct contact between the integrated circuit and the textile substrate and for the radio module to be situated above the integrated circuit, without being able to make direct contact with the textile substrate.

The following points should be noted:

The support substrate according to the present invention is preferably a textile substrate. The aforementioned material is not limiting.

The tag is formed directly on the textile substrate.

The fabric to be tracked may be fixed to the tag by means of stitching of the fabrics (i.e. fabric of the textile substrate of the tag and fabric of the garment to be tracked). Such a fixing method is not limiting.

The protective coating, for example the resin, comes into direct contact with the radio module, the integrated circuit and the support substrate, only in the area around the radio module and the integrated circuit, without covering other parts of the substrate.

BRIEF DESCRIPTION OF THE DRAWING

FIG. 1 shows in schematic form a tag for a fabric according to the present invention.

DESCRIPTION OF THE INVENTION

With reference to FIG. 1, below a method for manufacturing a tag 10 for a fabric is described, in particular but not exclusively a tag 10 for identification of a garment (not shown in the figures) intended to be associated with it, for example for identification in a laundry.

The tag 10 comprises:
 a radio module with an ultra high transmission frequency (UHF), denoted by 1;
 a radio-frequency identification integrated circuit (RFID IC), denoted by 2, connected to the UHF radio module 1;
 an antenna 3; and
 a textile substrate 4 for supporting the UHF radio module 1, the RFID integrated circuit 2 and the antenna 3.

The method comprises the steps of:
 mounting the UHF radio module 1 and the RFID integrated circuit 2 on the substrate 4, these being already connected together by means of metal tracks; and
 mounting the antenna 3 on the substrate 4, around the UHF radio module 1 and the RFID integrated circuit 2.

The method is characterized by:
 applying a protective coating 5 onto the UHF radio module 1 and onto the RFID integrated circuit 2, said step of applying the protective coating 5 comprising:
 coating the metal tracks for electrical connection between the RFID integrated circuit 2 and a UHF module 1, so as to protect the electric interconnection between the RFID integrated circuit 2 and the UHF radio module 1 and further comprising:
 coating a surface portion of the substrate 4 situated around the UHF radio module 1 and the RFID integrated circuit 2, so as to protect the structural interconnection between the UHF radio module 1 and the substrate 4 and so as to keep the UHF radio module 1 and the RFID integrated circuit 2 in a fixed position on the substrate 4.

In particular, the step of applying the protective coating 5 further comprises:
 coating a portion of the antenna 3 situated on the surface portion of the substrate 3, in order to protect the structural connection between the antenna 3 and the substrate 4. Even more particularly, the step of applying the protective coating 5 further comprises:

total incorporation of the RIFD integrated circuit 2 and the UHF radio module 1 in the protective coating 5 above the substrate 4.

Specifically, the step of applying the protective coating 5 comprises, for example:

pouring a resin or a glue and a step for solidification of the resin or glue.

The protective coating 5 becomes rigid at the end of the solidification step.

Advantageously. the antenna portion intended to be coated by the protective coating 5 forms a shoulder for containing the coating 5, for example the glue or the resin, therefore preventing dispersion thereof in areas of the substrate relatively far from the UHF radio module 1 and from the RFID integrated circuit 2, thus allowing the entire predefined amount of protective coating 5 to be used in the areas to be protected. Moreover, the antenna portion intended for the coating increases the adhesion of the protective coating material.

However, according to other embodiments of the present invention, the protective coating 5 may be formed by means of another covering material (namely without using glue or resin), for example, but not exclusively, a covering material which does not require any solidification step in order to become rigid.

It should be pointed out that the term "protective coating 5" used in the present invention does not indicate necessarily a coating which adheres perfectly to the UHF radio module 1 and the RFID integrated circuit 2, as in the case of a glue or resin, but may also indicate a covering of said UHF radio module 1 and RFID integrated circuit 2 which is, at least partly, not in contact with the UHF radio module 1 and the RFID integrated circuit 2, and also not in direct with the metal tracks for electrical connection thereof, or at least not in contact along the entire length of the metal tracks, but which is nevertheless designed to protect the electrical connection thereof with the UHF radio module 1 and the RFID integrated circuit 2 and to cover at least a surface portion of the substrate 4 situated around the UHF radio module 1 and the RFID integrated circuit 2, so as to protect also the structural interconnection between the UHF radio module 1 and the substrate 4 and keep the UHF radio module 1 and the RFID integrated circuit 2 in a fixed position on the substrate 4.

The antenna 3 is preferably a wire, in particular a metal wire, and the step of mounting the antenna 3 on the substrate 4 comprises stitching the antenna 3 onto the textile substrate 4.

The antenna is stitched at a predetermined distance from the RIFD integrated circuit 2 and the UHF radio module 1 and forms a—preferably closed—ring for inductive coupling with the UHF radio module 1. The antenna extends over the substrate beyond the ring, for example in opposite directions with respect to the module, forming preferably turns or sinusoidal loops.

The UHF radio module 1 comprises a PCB (printed circuit board) which incorporates metal tracks intended to act as a short-range inductor.

The RFID integrated circuit 2 is already electrically connected to the metal tracks of the UHF radio module 1 before the step of mounting the UHF radio module 1 and the RFID integrated circuit 2 on the substrate 4, said metal tracks however being exposed or not coated with any resin before the step of mounting the UHF radio module 1 and the RFID integrated circuit 2.

Advantageously, the tag thus formed:

is particularly flexible;

rigidly fixes the module, the circuit and the antenna on the substrate;

is particularly thin;

is particularly cost-efficient.

The invention claimed is:

1. A method for manufacturing a tag for RFID tracking of a fabric, in particular, but not exclusively a tag for identification of a garment associated with it, the tag comprising:

a radio module, with an ultra high transmission frequency (UHF);

a radio-frequency identification (RFID) integrated circuit connected to the UHF radio module;

an antenna; and a substrate supporting the UHF radio module, the RFID integrated circuit and the antenna;

the method comprising the steps of:

mounting the UHF radio module and the RFID integrated circuit on the substrate, these being already electrically connected together by means of metal tracks;

mounting the antenna on the substrate, around the UHF radio module and the RFID integrated circuit;

applying a protective coating onto the UHF radio module and onto the RFID integrated circuit, said step of applying the protective coating comprising:

coating the metal tracks for electrical connection between the RFID integrated circuit and the UHF module, so as to protect the electric interconnection between the RFID integrated circuit and the UHF radio module and further comprising:

fixing the UHF radio module and the RFID integrated circuit to the substrate by coating a surface portion of the substrate situated around the UHF radio module and the RFID integrated circuit, so as to protect the structural interconnection between the UHF radio module and the substrate and keep the UHF radio module and the RFID integrated circuit in a fixed position on the substrate, and before fixing the UHF radio module and the RFID integrated circuit to the substrate, the metal tracks connecting the UHF radio module and the RFID integrated circuit are externally exposed and the UHF radio module and the RFID integrated circuit are not incorporated by a protective material, the UHF radio module and the RFID integrated circuit being also not incorporated in an inlay and being not structurally associated with the antenna before fixing the UHF radio module and the RFID integrated circuit, wherein coating the metal tracks and fixing the UHF radio module and the RFID integrated circuit to the substrate are made in the same step by means of a resin or glue used as said protective coating.

2. The method for manufacturing a tag according to claim 1, wherein said step of applying the protective coating further comprises:

coating a portion of the antenna situated on said surface portion of the substrate, so as to protect the structural interconnection between the antenna and the substrate.

3. The method for manufacturing a tag according to claim 1, wherein said step of applying the protective coating further comprises:

total incorporation of the RFID integrated circuit and the UHF radio module in the protective coating.

4. The method for manufacturing a tag according to claim 1, wherein said step of applying the protective coating comprises:

pouring the resin or the glue and, solidification of the resin or glue, said protective coating being rigid at the end of the solidification step.

5. The method for manufacturing a tag according to claim 1, wherein said antenna is a wire and said step of mounting the antenna Hon the substrate comprises stitching the antenna onto the substrate.

6. The method for manufacturing a tag according to claim 5, wherein said antenna is stitched at a predetermined distance from the RFID integrated circuit and the UHF radio module and forms a preferably closed-ring for inductive coupling with the UHF radio module.

7. The method for manufacturing a tag according to claim 1, wherein the UHF radio module comprises a printed circuit board which incorporates metal tracks intended to act as a short-range inductor, and the RFID integrated circuit already electrically connected to the metal tracks of the UHF radio module before the step of mounting the UHF radio module and the RFID integrated circuit onto the substrate, said metal tracks being however exposed and not coated with any resin before said step of mounting the UHF radio module and the RFID integrated circuit.

8. The method for manufacturing the tag according to claim 1, wherein said support substrate is a textile substrate.

9. The method for manufacturing the tag according to claim 8, wherein:
- the radio module and the integrated circuit are already connected to together by means of flip chip or wire bonding technology before the step of mounting the UHF radio module and the RFID integrated circuit on the substrate;
- the radio module and the integrated circuit are not inserted in a layer or in a multi-layer structure; and
- the protective coating makes direct contact with the radio module, the integrated circuit and an area of the support substrate situated immediately around the radio module and the integrated circuit without extending over other areas of the support substrate.

10. A tag for a fabric, in particular, but not exclusively a tag for the identification of a garment associated with it, for example for identification in a laundry, wherein it is made by means of the method according to claim 1.

* * * * *